(12) United States Patent
Yokota et al.

(10) Patent No.: US 7,524,102 B2
(45) Date of Patent: Apr. 28, 2009

(54) LIGHT SOURCE DEVICE AND LIQUID CRYSTAL DISPLAY APPARATUS

(75) Inventors: Masashi Yokota, Suzuka (JP); Tsutomu Tsuji, Tsu (JP); Takaharu Kikuchi, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 117 days.

(21) Appl. No.: 11/822,410

(22) Filed: Jul. 5, 2007

(65) Prior Publication Data

US 2008/0007947 A1    Jan. 10, 2008

(30) Foreign Application Priority Data

Jul. 6, 2006 (JP) ............................. 2006-186614
Apr. 26, 2007 (JP) ............................. 2007-117509

(51) Int. Cl.
*B60Q 1/08* (2006.01)
*G02F 1/3331* (2006.01)

(52) U.S. Cl. .................... 362/634; 362/97; 362/252; 362/260; 349/58; 349/67

(58) Field of Classification Search ......... 362/632–634, 362/225, 252, 260; 349/58, 67
See application file for complete search history.

(56) References Cited

U.S. PATENT DOCUMENTS 7,159,999 B2 * 1/2007 Yoo et al. ................... 362/249
7,452,101 B2 * 11/2008 Lan et al. .................... 362/225
7,461,958 B2 * 12/2008 Takata et al. ................ 362/433
2006/0050500 A1 * 3/2006 Chang et al. .................. 362/29
2006/0268542 A1 * 11/2006 Chen et al. ................... 362/225

FOREIGN PATENT DOCUMENTS

| JP | 6-75216 | 3/1994 |
|----|---------|--------|
| JP | 2001-210126 A | 8/2001 |
| JP | 2005-347005 A | 12/2005 |
| JP | 2006-32358 A | 2/2006 |
| JP | 2007-47469 A | 2/2007 |
| WO | WO-2005/083322 A1 | 9/2005 |

* cited by examiner

*Primary Examiner*—Ali Alavi
(74) *Attorney, Agent, or Firm*—Birch, Stewart, Kolasch & Birch, LLP

(57) ABSTRACT

A light source device includes: at least four rod-shaped lamps; an attachment plate to which the at least four lamps are attached substantially parallel to one another in a condition where the pitches between the lamps are different from one another; and a plurality of lamp clips each having two holding portions holding adjoining two lamps at middle parts thereof. The separation distance between the two holding portions of a first lamp clip holding two lamps and the separation distance between the two holding portions of a second lamp clip holding two lamps adjoining the two lamps are substantially the same.

6 Claims, 4 Drawing Sheets

LIGHT SOURCE DEVICE AND LIQUID CRYSTAL DISPLAY APPARATUS

CROSS-REFERENCE TO RELATED APPLICATIONS

This Nonprovisional application claims priority under 35 U.S.C. §119(a) on Patent Application No. 2006-186614 and No. 2007-117509 filed in Japan on Jul. 6, 2006 and Apr. 26, 2007 respectively, the entire contents of which are hereby incorporated by reference.

BACKGROUND

1. Technical Field

The present application relates to a light source device having lamp clips holding lamps, and a liquid crystal display apparatus.

2. Description of the Related Art

Liquid crystal display apparatuses are formed of a lamination of a liquid crystal display panel and a light source device in which a plurality of rod-shaped lamps each having both ends held are juxtaposed substantially parallel to one another on a chassis. The both ends of the lamps are fixed, for example, by a lamp holder disposed at each side of the light source device.

In recent years, with the increase in the size of liquid crystal display apparatuses, the number of lamps of the light source device has tended to increase, and the lamps has tended to become longer and thinner.

Regarding the increase in the number of lamps, a light source device has been proposed in which in order to reduce the number of lamps while maintaining the required brightness and suppressing the unevenness in the brightness of the light source device, the lamps are so arranged as to be close in the neighborhood of the center in the direction of juxtaposition of the lamps and to be sparse in the neighborhood of both ends in the direction of juxtaposition of the lamps (see Japanese Unexamined Patent Application Publication No. H06-75216).

In this light source device, the plurality of lamps are juxtaposed in such a manner that the pitch gradually increases from the center in the direction of juxtaposition toward both ends in the direction of juxtaposition. Consequently, the brightness is highest in the center of the screen of the liquid crystal display panel, and gradually decreases toward both ends of the screen. By reducing the number of lamps in this way, reduction in power consumption and reduction in size, thickness, and weight are achieved.

On the other hand, regarding the increase in the length and the decrease in the thickness of the lamps, a light source device has been proposed in which in order to maintain the performance, quality, and the like of the light source device by reliably holding the lamps that have become longer and thinner, lamp clips holding middle parts of the lamps at least one or two points are provided as well as lamp holders holding both ends of the lamps (see Japanese Unexamined Patent Application Publication No. 2001-210126).

When the lamps are held one by one by using lamp clips each having one holding portion holding one lamp, a problem arises in which the number of lamp clips increases and this increases the number of man-hours for holding the lamps by using the lamp clips.

To solve this problem, Japanese Unexamined Patent Application Publication No. 2001-210126 discloses lamp clips integrally provided with a plurality of holding portions holding a plurality of adjoining lamps, respectively.

When such lamp clips are used, since the lamps can be held in such a manner that a plurality of adjoining lamps are held together, the number of lamp clips and the number of man-hours associated with the lamp clips can be reduced. Specifically, for example, when four lamps are juxtaposed, two lamp clips integrally provided with two holding portions holding adjoining two lamps, respectively, are provided, and the lamp holding operation is performed twice.

In particular, the lamp clips disclosed in Japanese Unexamined Patent Application Publication No. 2001-210126 have a partly opened arc-shaped grasping configuration, are made of a transparent material having flexibility, are integrally molded as clips for one tube and for multiple tubes, protect the lamps, ensure the position accuracy of the lamp arrangement to prevent the brightness unevenness on the information display screen, and prevent the influence of the shadows of the lamp holders on the brightness reduction and the brightness unevenness on the information display screen by using the transparent material.

When a plurality of lamps are juxtaposed with different pitches as disclosed in Japanese Unexamined Patent Application Publication No. H06-75216 and the lamps are held by using the lamp clips disclosed in Japanese Unexamined Patent Application Publication No. 2001-210126, a structure is considered in which all the lamp clips are arranged in a staggered configuration in such a manner that one lamp is associated with one lamp clip.

However, with this structure, a problem arises in which the number of lamp clips increases and the number of man-hours for holding the lamps by using the lamp clips increases.

Accordingly, a structure is considered in which all the lamp clips are arranged in a staggered configuration in such a manner that two lamps are associated with one lamp clip.

However, since the pitches between the lamps are not fixed, it is necessary to prepare various kinds of lamp clips the separation distances between the two holding portions of which are different from one another in correspondence with the various pitches, and this excessively increases the number of kinds of lamp clips.

SUMMARY

The present application is made in view of such circumstances, and a principal object thereof is to provide a light source device in which the number of kinds of lamp clips can be reduced since the separation distances between the two holding portions of two lamp clips each holding two of adjoining four lamps are substantially the same, and a liquid crystal display apparatus having the light source device.

Another object of the present application is to provide a light source device in which the lamps can be held without any overload on the lamps since the separation distances between the two holding portions of two lamp clips each holding two of adjoining four lamps are distances intermediate between the separation distances between the two lamps held by the lamp clips.

Still another object of the present application is to provide a light source device in which the lamps can be held without any overload on the lamps since the separation distances between the two holding portions of the two lamp clips each holding two of adjoining four lamps are different from one another.

In a light source device according to the present application in which at least four rod-shaped lamps are juxtaposed substantially parallel to one another with different pitches on an attachment plate to which the lamps are attached, and a plurality of lamp clips each having at least two holding portions holding middle parts of adjoining two lamps are provided, the separation distance between the two holding portions of a first lamp clip holding two lamps and the separation distance between the two holding portions of a second lamp clip holding two lamps adjoining the two lamps are substantially the same.

In the light source device according to the present application, the separation distance between the two holding portions is a distance intermediate between the pitch between the two lamps held by the first lamp clip and the pitch between the two lamps held by the second lamp clip.

In the light source device according to the present application, at least six lamps are juxtaposed, and the separation distance between the two holding portions of a third lamp clip holding lamps adjoining the two lamps held by the first or second lamp clip is different from the separation distance between the two holding portions of the first or second lamp clip.

In the light source device according to the present application, the adjoining two lamps are held by the first lamp clip at the middle parts in such a manner as to make the lamps closer to each other, and the two lamps adjoining the two lamps are held by the second lamp clip at the middle parts in such a manner as to make the lamps more separated from each other.

In the light source device according to the present application, the plurality of lamp clips have translucency.

A liquid crystal display apparatus according to the present application includes a liquid crystal panel and the above-described light source device provided on the back side of the liquid crystal panel.

In the present application, the separation distance between the two holding portions of the first lamp clip and the separation distance between the two holding portions of the second lamp clip are substantially the same.

In this specification, that the separation distances are substantially the same indicates that the difference between the separation distance between the holding portions of one lamp clip and the separation distance between the holding portions of the other lamp clip is smaller than the largest one of the bend amounts, at the lamp clip attachment positions, of the lamps which are bent as described later.

For example, a first to fourth rod-shaped lamps are juxtaposed substantially parallel to one another on the attachment plate. The pitch between the first lamp and the second lamp, the pitch between the second lamp and the third lamp, and the pitch between the third lamp and the fourth lamp increase (decrease), for example, in this order. The first lamp clip holds the middle parts of the first and second lamps with the two holding portions. The second lamp clip holds the middle parts of the third and fourth lamps with the two holding portions.

When the separation distance between the two holding portions of the first lamp clip is substantially equal to the pitch between the first and second lamps, the separation distance between the two holding portions of the second lamp clip is smaller (larger) than the pitch between the third and fourth lamps.

However, since the lamps are rod-shaped, the third and fourth lamps are readily bent in the direction that makes them closer to each other (more separated from each other) to be held by the second lamp clip.

Conversely, when the separation distance between the two holding portions of the second lamp clip is substantially equal to the pitch between the third and fourth lamps, the separation distance between the two holding portions of the first lamp clip is larger (smaller) than the pitch between the first and second lamps.

However, since the lamps are rod-shaped, the first and second lamps are readily bent in the direction that makes them more separated from each other (closer to each other) to be held by the first lamp clip.

In the present application, the separation distance between the two holding portions of each of the first and second lamp clips is a distance intermediate between the pitch between the first and second lamps and the pitch between the third and fourth lamps (for example, substantially equal to the pitch between the second and third lamps).

That is, the separation distance between the two holding portions of the first (second) lamp clip is a distance approximate to the pitch between the first and second lamps and the pitch between the third and fourth lamps although it is different from the pitches.

In the present application, the separation distance between the two holding portions of the third lamp clip is different from the separation distance between the two holding portions of the first (second) lamp clip.

For example, the first to sixth rod-shaped lamps are juxtaposed substantially parallel to one another on the attachment plate. The pitch between the first and second lamps, the pitch between the second and third lamps, the pitch between the third and fourth lamps, the pitch between the fourth and fifth lamps, and the pitch between the fifth and sixth lamps increase (decrease), for example, in this order.

The first (second) lamp clip holds the middle parts of the first and second (third and fourth) lamps with the two holding portions. The third lamp clip holds the middle parts of the fifth and sixth lamps with the two holding portions.

The pitch between the first and second lamps and the pitch between the fifth and sixth lamps are largely different from each other. For this reason, the separation distance between the two holding portions of each of the first and second lamp clips is made appropriate for both of the pitch between the first and second lamps and the pitch between the third and fourth lamps, and the separation distance between the two holding portions of the third lamp clip is made appropriate for the pitch between the fifth and sixth lamps.

With the light source device according to the present application, even when the separation distances between the two holding portions of the lamp clips and the pitches between the adjoining two lamps are different from each other, the two lamps which are rod-shaped are bent in the direction that makes them closer to each other or more separated from each other according to the separation distance between the two holding portions. Consequently, adjoining two lamp clips can be held by the two holding portions of one lamp clip.

That is, since it is unnecessary that the separation distance between the two holding portions and the pitch between the two lamps be the same, the number of kinds of lamp clips can be reduced.

With the light source device according to the present application, the separation distances between the two holding portions of the lamp clips and the pitches between the two lamps held by the lamp clips are approximate to each other.

Consequently, overloading on the lamps that are bent by being held by the lamp clips can be suppressed while the number of kinds of lamp clips is reduced.

If the separation distances between the two holding portions and the pitches between the two lamps are excessively different from each other, the lamps are excessively bent and this overloads the lamps, which can result in distortion or breakage of the lamps and degradation in the performance and quality of the light source device due to the distortion or breakage of the lamps.

With the light source device according to the present application, the separation distance between the two holding portions of each of the first and second lamp clips each holding two of the adjoining first to fourth lamps is made appropriate for both of the pitch between the first and second lamps and the pitch between the third and fourth lamps, and the separation distance between the two holding portions of the third lamp clip holding the fifth and sixth lamps adjoining the first to fourth lamps is made appropriate for the pitch between the fifth and sixth lamps.

Consequently, overloading on the lamps that are bent by being held by the lamp clips can be suppressed while the number of kinds of lamp clips is reduced.

If the separation distances between the two holding portions of the first to third lamp clips are substantially the same, there are cases where the separation distances and the pitch between the fifth and sixth lamps are excessively different from each other. Consequently, there are cases where the fifth and sixth lamps are excessively bent by being held by the third lamp clip and this overloads the fifth and sixth lamps.

The above and further objects and features of the invention will more fully be apparent from the following detailed description with accompanying drawings.

DETAILED DESCRIPTION

Hereinafter, an embodiment of the present application will be described in detail based on the drawings.

Figure 1:
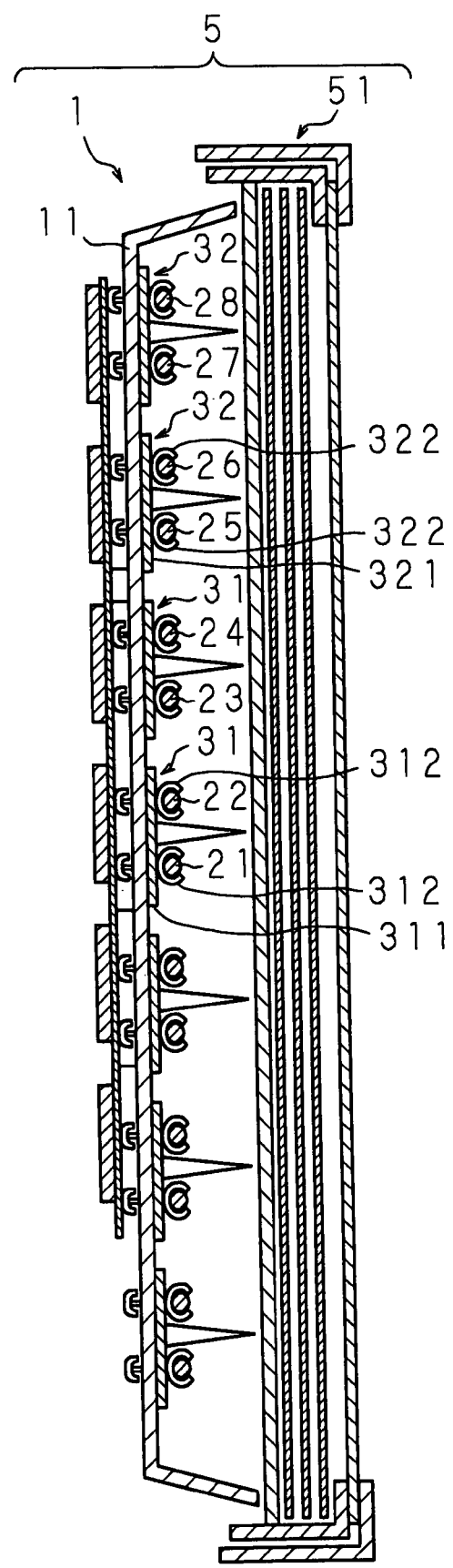
FIG. 1 is a simplified longitudinal cross-sectional view of a light source device according to an embodiment.

FIG. 1 is a simplified longitudinal cross-sectional view of a light source device 1 according to the embodiment, and is also a simplified longitudinal cross-sectional view of a liquid crystal display apparatus 5 having the light source device 1.

Figure 2:
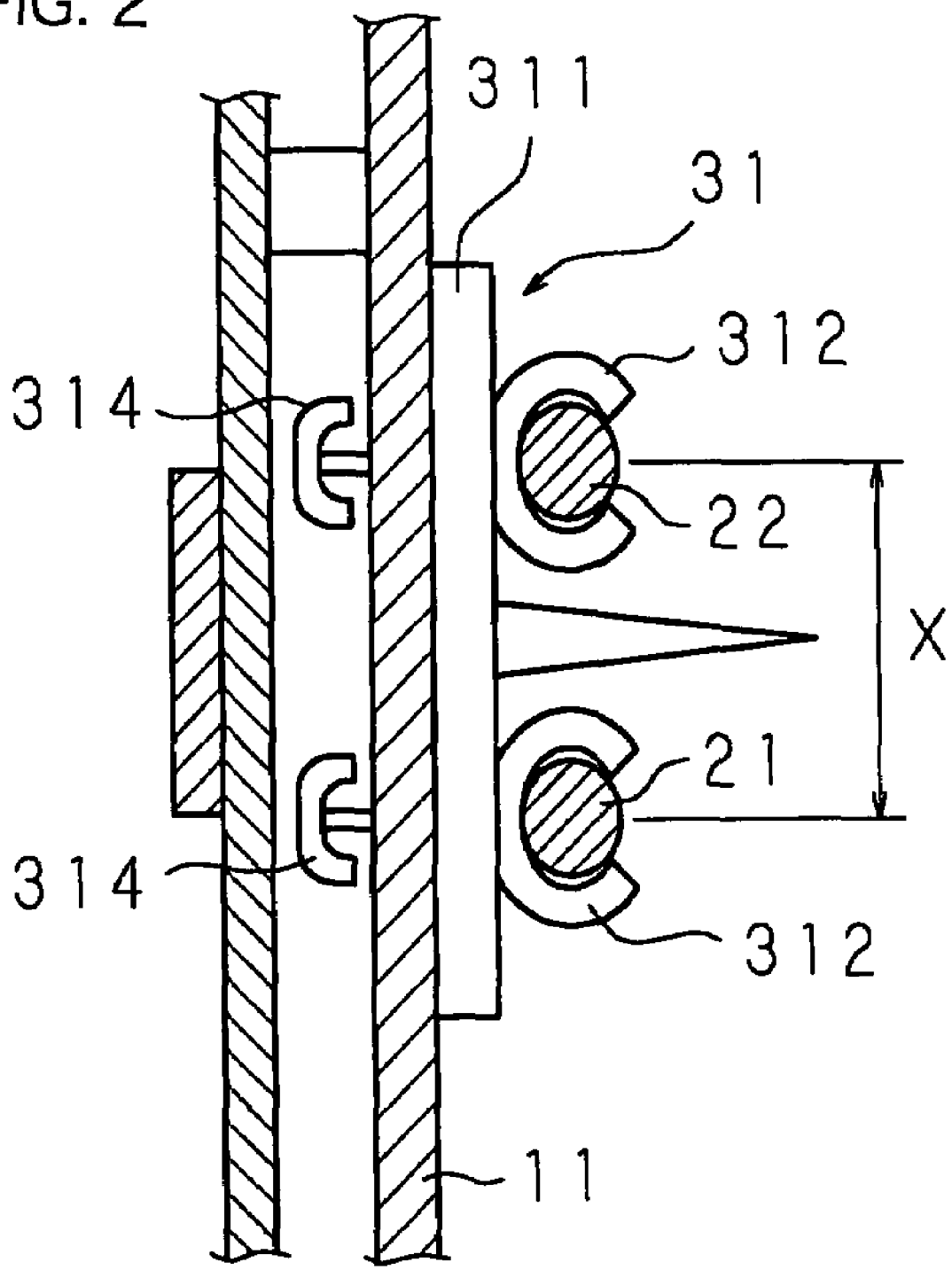
FIG. 2 is a side view showing the structure of a lamp clip that the light source device has.
Figure 3:
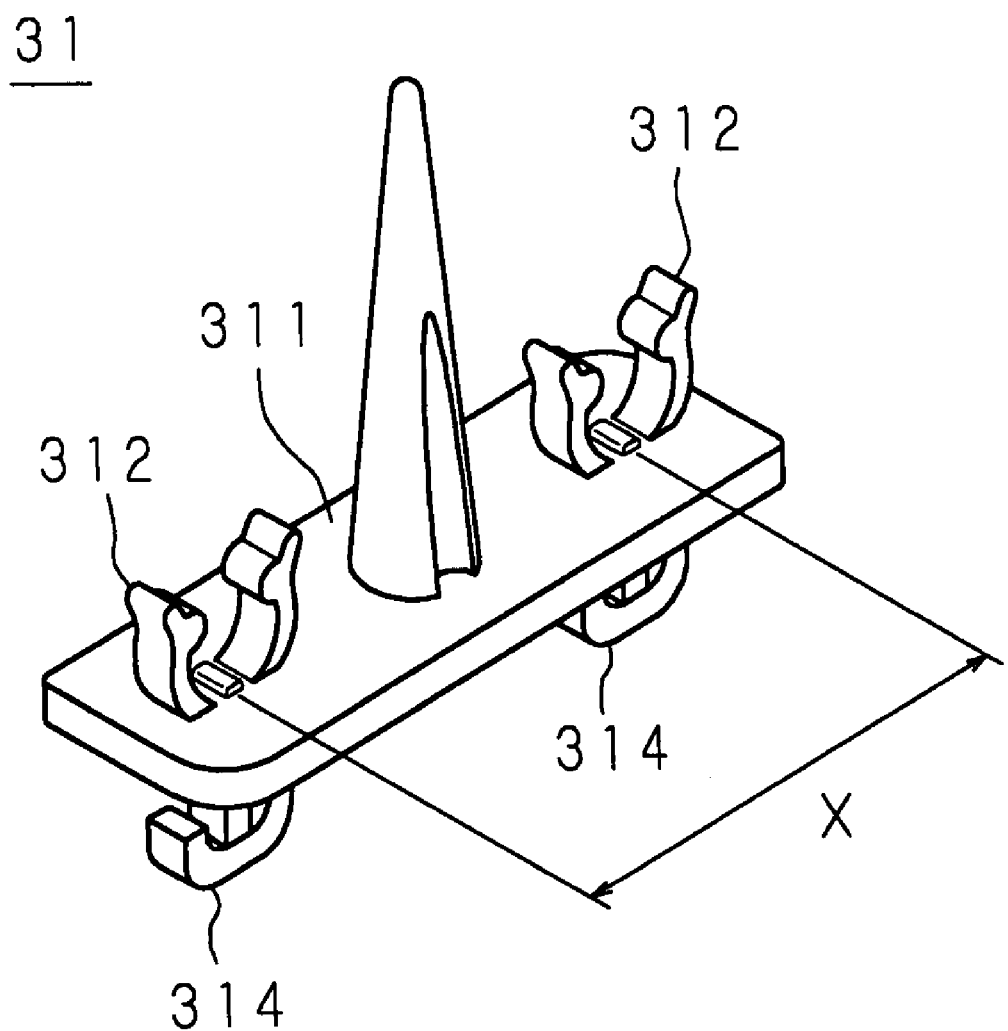
FIG. 3 is a perspective view showing the structure of the lamp clip that the light source device has.

FIG. 2 and FIG. 3 are a side view and a perspective view showing the structure of a lamp clip 31 that the light source device 1 has, respectively. FIG. 2 is also an enlarged simplified longitudinal cross-sectional view of the light source device 1 showing the neighborhood of the lamp clip 31.

Figure 4:
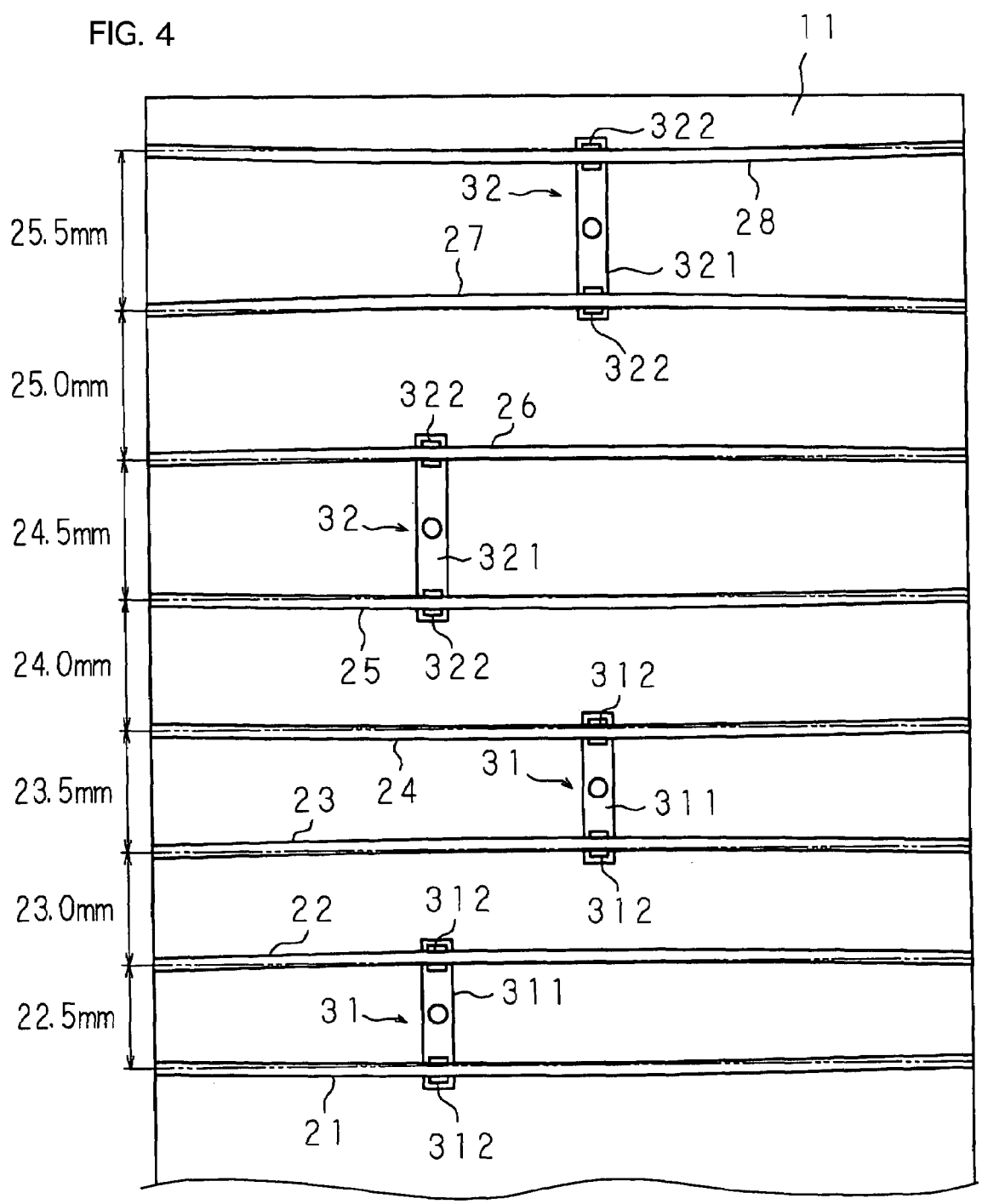
FIG. 4 is a schematic view showing the arrangement of the lamp clips that the light source device has.

FIG. 4 is a schematic view showing the arrangement of the lamp clips 31, 31, 32, and 32 that the light source device 1 has, and is also an upper front view of the light source device 1.

The light source device 1 which is used as a back light device is provided in the liquid crystal display apparatus 5 longitudinally placed by setting a non-illustrated leg on the floor, and is laminated behind a rectangular liquid crystal display panel 51 as shown in FIG. 1.

The light source device 1 according to the present embodiment has a plurality of lamps including lamps 21 to 28. Since these lamps are arranged vertically symmetrically with respect to the center in the vertical direction of the light source device 1, the lamps 21 to 28 disposed on the upper side of the light source device 1 will be described in the following: Here, the vertical direction is the vertical direction in FIG. 1 to FIG. 4, and is a direction vertical to the direction of length of the lamps 21 to 28 in a condition of being attached to a chassis 11 as described later (more specifically, in a condition of being attached to the chassis 11 and not being bent as described later).

The light source device 1 has the chassis 11 as the attachment plate to which the lamps 21 to 28 are attached. The chassis 11 is formed by disposing a non-illustrated reflecting sheet that reflects light or applying a coating that reflects light, onto the inner surface of a rectangular dish-like metal material. Consequently, the chassis 11 also has the function of reflecting the light emitted from the lamps 21 to 28, toward the liquid crystal display panel 51.

In the following, description as to the reflecting sheet (or the coating) of the chassis 11 is omitted.

For example, the chassis 11 has engagement holes for attaching the lamp clips 31 and 32 to the chassis 11 as described later, and the engagement holes are so formed as to pass through not only the chassis 11 but also the reflecting sheet (or the coating) of the chassis 11.

The lamps 21 to 28 are rod-shaped; specifically, they have a cylindrical form with a long length and a small diameter (the length is not less than several tens of cm, and the inner diameter is not more than 5 mm), and are substantially of the same shape. The lamps 21 to 28 have a length of 1200 mm, and are formed by using soft glass or hard glass having the property of being capable of being bent by approximately 0.5 mm at the maximum. The lamps 21 to 28 formed by using soft glass resist breakage more than the lamps 21 to 28 formed by using hard glass when they are bent. As long as having such a property, the material is not limited to soft glass or hard glass.

As shown in FIG. 4, the lamps 21 to 28 are juxtaposed in this order substantially parallel to one another in such a manner that the pitch increases from the center in the vertical direction toward the upper end of the light source device 1. In this specification, the intervals between the ends of the adjoining lamps 21 to 28 of the lamps 21 to 28 arranged as shown in FIG. 4 are designated as pitches (for example, 22.5 to 25.5 mm).

Specifically, the lamp 21 is disposed at the center in the vertical direction of the light source device 1, the lamp 22 is disposed above the lamp 21 with a pitch of 22.5 mm, the lamp 23 is disposed above the lamp 22 with a pitch of 23.0 mm, and the lamp 24 is disposed above the lamp 23 with a pitch of 23.5 mm.

Likewise, the lamp 24 (26, 27, 28) is disposed above the lamp 24 (25, 26, 27) with a pitch of 24.0 (24.5, 25.0, 25.5) mm.

Here, since the lamps 21 to 28 are each attached to the chassis 11 in a condition of being slightly bent in a middle part thereof as described later, in this embodiment, the pitches between the lamps 21 to 28 are equal to the separation distances between both ends of the lamps 21 to 28, and do not denote the separation distances between the middle parts of the lamps 21 to 28. In FIG. 4, the lamps 21 to 28 in the bent condition are shown by solid lines, and virtual straight lines connecting both ends of the lamps 21 to 28 are shown by chain double-dashed lines.

By arranging the lamps 21 to 28 in such a manner that lamps are close in the center in the vertical direction and are sparse in the upper and lower end parts as described above, the brightness is highest in the center in the vertical direction of the screen of the liquid crystal display panel 51, and the screen brightness gradually decreases from the center toward the upper and lower ends in the vertical direction. In this case, a sufficient brightness is ensured while the brightness unevenness of the liquid crystal display panel 51 is suppressed, and further, the number of lamps included in the light source device 1 is reduced.

The lamps 21 to 28 are held at both ends thereof by non-illustrated lamp holders attached to the chassis 11.

Further, the middle parts of the lamps 21 and 22 and the lamps 23 and 24 are held by at least one or two lamp clips 31. Likewise, the middle parts of the lamps 25 and 26 and the lamps 27 and 28 are held by at least one or two lamp clips 32. FIG. 4 illustrates a condition in which one positions in the middle parts of the lamps 21 to 28 are held by a total of four lamp clips 31, 31, 32, and 32. That is, the middle parts of the lamps 21 to 28 held by the lamp clips 31, 31, 32, and 32 are not necessarily the positions exactly at half the length of the lamps 21 to 28, but may be any positions at least other than both ends of the lamps 21 to 28.

Since the configurations of the lamp clips 31 and 32 are substantially the same, the configuration of the lamp clip 31 will mainly be described in the following:

As shown in FIG. 1 to FIG. 4, the lamp clip 31 has a rectangular flat-shaped base 311. Holding portions 312 and 312 having a partly opened arc-shaped grasping configuration are integrally formed in a protruding condition on one surface (obverse surface) of the base 311, and engagement portions 314 and 314 are integrally formed in a protruding condition on the other surface (reverse surface) of the base 311.

To form such a lamp clip 31, the parts are integrally molded, for example, by using a colorless and transparent acrylic resin. Since the lamp clip 31 is colorless and transparent, the reduction in the brightness of the liquid crystal display panel 51 because of the shadow of the lamp clip 31 can be suppressed. In addition, the lamp clip 31 is easily manufactured because it is integrally molded by using a synthetic resin.

The holding portions 312 are each formed in an appropriate thickness to provide the holding portions 312 with flexibility. The inner dimensions of the holding portions 312 are slightly smaller than the outer diameter of the lamp 21. The lamps 21 and 22 are pushed into the holding portions 312 and 312 from the openings of the holding portions 312 and 312 while both ends of the openings of the holding portions 312 and 312 are bent outside. After the lamps 21 and 22 are inserted in the holding portions 312 and 312, both ends of the openings of the holding portions 312 and 312 sandwich the lamps 21 and 22 by elasticity, whereby the lamps 21 and 22 are grasped by the holding portions 312 and 312.

The holding portions 312 and 312 are so juxtaposed as to be separated by X mm in the direction of length of the base 311. Regarding the lamp clip 31, the separation distance X between the holding portions 312 and 312 is 23.0 mm. This distance is substantially equal to the pitch between the lamps 22 and 23. That is, it is a distance intermediate between the pitch of 22.5 mm between the lamps 21 and 22 and the pitch of 23.5 mm between the lamps 23 and 24.

Here, as shown in FIG. 1 and FIG. 4, like the lamp clip 31, the lamp clip 32 includes a base 321 corresponding to the base 311, holding portions 322 and 322 corresponding to the holding portions 312 and 312, and engagement portions corresponding to the engagement portions 314 and 314. However, regarding the lamp clip 32, the separation distance X between the holding portions 322 and 322 is 25.0 mm. This distance is substantially equal to the pitch between the lamps 26 and 27. That is, it is a distance intermediate between the pitch of 24.5 mm between the lamps 25 and 26 and the pitch of 25.5 mm between the lamps 27 and 28.

As shown in FIG. 2 and FIG. 3, the engagement portions 314 and 314 are arrow-shaped and disposed substantially just behind the holding portions 312 and 312 with respect to the base 311. The base end sides of the arrows are continuous with the base 311, and the tip sides of the arrows are formed in an appropriate thickness to provide the tips of the engagement portions 314 and 314 with flexibility.

To attach the lamp clip 31 to the chassis 11, the engagement portions 314 and 314 are inserted into non-illustrated engagement holes formed in the chassis 11 from the inside to the outside of the chassis 11. In this case, the tips of the engagement portions 314 and 314 are bent to decrease in size when the engagement portions 314 and 314 are inserted in the engagement holes of the chassis 11, and after the insertion is completed, the tips of the engagement portions 314 and 314 return to the original shape, thereby engaging the engagement portions 314 and 314 with the chassis 11.

The engagement holes of the chassis 11 to which the lamp clips 31, 31, 32, and 32 are to be attached are formed in a staggered configuration in the direction of juxtaposition of the lamps 21 to 28. Consequently, the lamp clip 31 holding the lamps 21 and 22, the lamp clip 31 holding the lamps 23 and 24, the lamp clip 32 holding the lamps 25 and 26, and the lamp clip 32 holding the lamp 27 and 28 are arranged in a staggered configuration as shown in FIG. 4.

Next, the arrangement of the lamp clips 31, 31, 32, and 32 will be described.

One lamp clip 31 holds the lamps 21 and 22. The other lamp clip 31 holds the lamps 23 and 24. Likewise, one (the other) lamp clip 32 holds the lamps 25 and 26 (27 and 28).

The separation distance X between the holding portions 312 and 312 of the lamp clip 31 is longer by 0.5 mm than the pitch between the lamps 21 and 22. For this reason, by the holding portions 312 and 312 holding the lamps 21 and 22, respectively, the rod-shaped lamps 21 and 22 are each bent by 0.25 mm at the maximum in the direction that makes them more separated from each other. In other words, the lamps 21 and 22 are held by the holding portions 312 and 312 of the lamp clip 31 by being bent in the direction that makes them more separated from each other.

On the other hand, the separation distance X between the holding portions 312 and 312 of the lamp clip 31 is shorter by 0.5 mm than the pitch between the lamps 23 and 24. For this reason, the lamps 23 and 24 are held by the holding portions 312 and 312 by each being bent by 0.25 mm at the maximum in the direction that makes them closer to each other.

Since the separation distance X between the holding portions 312 and 312 is a distance intermediate between the pitch between the lamps 21 and 22 and the pitch between the lamps 23 and 24, the bend amount of the lamps 21 and 22 and the bend amount of the lamps 23 and 24 are both small, so that overloading on the bent lamps 21 to 24 and breakage of the lamps 21 to 24 due to the overloading can be suppressed. In addition, the adverse effect of the bend of the lamps 21 to 24 on the performance, quality, and the like of the light source device 1 can be ignored.

Likewise, the lamps 25 and 26 (27 and 28) the pitch between which is longer (shorter) by 0.5 mm than the separation distance X between the holding portions 322 and 322 of the lamp clip 32 are held by the holding portions 322 and 322 by each being bent by 0.25 mm at the maximum in the direction that makes them more separated from each other (closer to each other).

Unlike the separation distance X between the holding portions 312 and 312 of the lamp clip 31, the separation distance X between the holding portions 322 and 322 of the lamp clip 32 is a distance intermediate between the pitch between the lamps 25 and 26 and the pitch between the lamps 27 and 28. For this reason, the bend amount of the lamps 25 and 26 and the bend amount of the lamps 27 and 28 are both small, so that overloading on the bent lamps 25 to 28 and breakage of the lamps 25 to 28 due to the overloading can be suppressed. In addition, the adverse effect of the bend of the lamps 25 to 28 on the performance, quality, and the like of the light source device 1 can be ignored.

In the light source device 1 as described above, with the adjoining two lamps 21 and 22, 23 and 24, 25 and 26, and 27 and 28 as pairs, each pair is held by one lamp clip 31 or 32.

Consequently, the number of lamp clips 31 and 32 that the light source device 1 has is smaller than that (eight) when the lamps 21 to 28 are held one by one, and further, the number of man-hours for holding the lamps 21 to 28 is smaller.

Moreover, the number of lamp clips 31 and 32 that the light source device 1 has is smaller than that when the adjoining two lamps 21 and 22, 23 and 24, 25 and 26, and 27 and 28 are held by using four lamp clips the separation distances of the two holding portions of which are 22.5 mm, 23.5 mm, 24.5 mm, and 25.5 mm, respectively (that is, the pitches between the two lamps to be held and the separation distances between the holding portions are substantially the same).

That is, as illustrated in FIG. 4, the interval between the holding portions of the lamp clip 32 holding the two lamps 27 and 28 the pitch between which is 25.5 mm which is the largest of the pitches between the four lamps 25 to 28 juxtaposed at gradually differing intervals is designed to be 25.0 mm which is smaller than the largest pitch 25.5 mm. On the other hand, the interval between the holding portions of the lamp clip 32 holding the two lamps 25 and 26 the pitch between which is 24.5 mm which is the smallest of the pitches between the four is also 25.0 mm, and is designed to be larger than the smallest pitch 24.5 mm.

As described above, in the light source device according to the present application, even when a plurality of lamps are arranged with different pitches, the intervals between the holding portions of the lamp clips can be made the same, so that the light source device can be manufactured with minimum increase in the number of kinds of lamp clips.

Thinking simply about the light source device according to the present application, there is apprehension that brightness unevenness occurs because of the lamps being held in the bent condition. However, since the intervals between the holding portions of the lamp clips are within the range between the largest and smallest ones of the pitches between the lamps to be held, if the light source device is structured under a condition where no brightness unevenness occurs at the largest pitch and at the smallest pitch, the brightness unevenness because of the lamps being held in the bent condition never occurs even if the lamp clips hold the adjoining lamps at intervals intermediate between the largest pitch and the smallest pitch.

The numerical values associated with the size, configuration, pitch, property, number, and the like of the parts are not limited to the numerical values described in the present embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A light source device comprising:
   at least four rod-shaped lamps;
   an attachment plate to which the at least four lamps are attached substantially parallel to one another in a condition where pitches between the lamps are different from one another; and
   a plurality of lamp clips each having at least two holding portions holding adjoining two lamps at middle parts thereof; wherein
   a separation distance between the two holding portions of a first lamp clip and a separation distance between the two holding portions of a second lamp clip adjoining the first lamp clip are substantially the same.

2. The light source device according to claim 1, wherein the separation distance between the two holding portions is a distance intermediate between the separation distance between the two lamps held by the first lamp clip and the separation distance between the two lamps held by the second lamp clip.

3. The light source device according to claim 1, wherein a separation distance between the two holding portions of a third lamp clip holding lamps adjoining the two lamps held by the first or second lamp clip is different from the separation distance between the two holding portions of the first or second lamp clip.

4. The light source device according to claim 1, wherein the adjoining two lamps are held by the first lamp clip at the middle parts of the lamps in such a manner as to make the lamps closer to each other, and the two lamps adjoining the two lamps are held by the second lamp clip at the middle parts of the lamps in such a manner as to make the lamps more separated from each other.

5. The light source device according to claim 1, wherein the plurality of lamp clips have translucency.

6. A liquid crystal display apparatus comprising:
   a liquid crystal panel; and
   the light source device according to claim 1 provided on a back side of the liquid crystal panel.

* * * * *